United States Patent Office 2,875,244
Patented Feb. 24, 1959

2,875,244

DICARBOXYLIC ACIDS FROM DICYCLO-PENTADIENES

Jeffrey H. Bartlett, Westfield, Robert S. Brodkey, Roselle, and Lewis W. Bowman, Westfield, N. J., assignors to Esso Research and Engineering Company, a corporation of Delaware No Drawing. Application December 13, 1955
Serial No. 552,711

8 Claims. (Cl. 260—514)

This invention relates to dicarboxylic acids derived from dimerized cyclodienes such as dicyclopentadiene. It relates particularly to dicarboxylic acids resulting from the caustic fusion of alcohol or ester derivatives of dicyclopentadiene which have been oxonated or treated with formaldehyde.

It is known that dicyclopentadiene can be hydrated to produce a secondary, unsaturated alcohol and that the latter alcohol can be hydrogenated and fused with caustic to produce a monocarboxylic acid. See Patent 2,567,026. Other monocarboxylic acids have been prepared by esteroxonation of dihydrogenated dicyclopentadiene as described in Patent 2,688,627. However, it has not been possible to produce the more desirable dicarboxylic acids by either of these methods, due to the relative inactivity of the second double bond of the cyclodiene molecule.

It is the main object of the present invention to provide dicarboxylic acid derivatives of dicyclopentadiene and its homologs, as well as a new method for their preparation. Other objects, as well as the nature, advantages and operation of the invention will become apparent from the subsequent description.

It has now been discovered that novel dicarboxylic acids can be advantageously prepared by first hydrating the dicyclopentadiene to provide an unsaturated secondary alcohol or ester of such alcohol, and then oxonating the remaining double bond of the unsaturated secondary alcohol or ester to produce the corresponding secondary alcohol-aldehyde or a glycol containing one secondary and one primary alcohol group attached to the polycyclic nucleus.

Finally, caustic fusion of the aforementioned hydroxy aldehydes, glycols, hydroxy esters, ester aldehydes, or mixtures of any of these polycyclic, difunctional dicyclopentadiene derivatives, results in the conversion of the primary alcohol or aldehyde group to the corresponding carboxylic acid group. At the same time there is a cleavage of the ring containing the secondary alcohol or its ester and an oxidation of the secondary alcohol residue to the carboxylic acid. Thus there has been no loss of carbon atoms from the cyclic system and a dicarboxylic acid having one more carbon atom than the original dicyclodiene is produced.

The hydration of the dicyclopentadiene may be carried out directly by reacting the diolefin with one mole of water under otherwise well known conditions. However, instead of direct hydration, it has been found preferable to convert the diolefin to esters by reacting the hydrocarbon with about 1 to 5 mole equivalents of a suitable mono- or dicarboxylic acid in the $C_1$ to $C_{20}$ and higher range, e. g., formic, acetic, propionic, capric, palmitic, isooctanoic, isotridecanoic, adipic, sebacic and the like. $C_1$ to $C_3$ fatty acids have been found especially convenient because of their relatively low cost and ease of separation from the final product. The addition of the acids to the olefinic group is preferably catalyzed by acid condensation catalysts such as $H_2SO_4$, $HClO_4$, $BF_3$, $BF_3 \cdot H_3PO_4$ and similar known condensation catalysts containing an acid-acting inorganic group, in a manner otherwise well known. About 0.2 to 10% of catalyst based on the olefin may be used. Suitable reaction temperatures are between about 40° and 120° C., preferably 50° to 90° C. Pressure may be used in order to prevent evaporation of the reagents. Residue times may range from about 1 to 10 hours. If desired, an inert solvent such as petroleum ether or hexane may be used also.

The hydrated products are then preferably purified by distillation or crystallization before being subjected to oxonation by reaction with a gas mixture of hydrogen and carbon monoxide. The $H_2/CO$ ratio in the gas mixture may range from about 0.5 to 2 volumes of hydrogen per volume of carbon monoxide. Other reaction conditions in this step desirably include temperatures in the range of about 110° to 190° C. and pressures in the range of 1500 to 4500 p. s. i. g. About 0.1 to 3%, based on the olefinic feed, of a cobalt catalyst such as cobalt oleate, naphthenate, acetate, oxide, etc., is employed in a manner otherwise well known in this type of carbonylation reactions. It is also convenient to use about 0.5 to 5 volumes of a diluent such as hexane or heptane per volume of olefinic feed material. The resulting aldehyde compound may then be converted to the corresponding primary alcohol by hydrogenation prior to the final alkali fusion step, or the latter step may be applied directly to the aldehyde compound. Furthermore, instead of reliance on an oxonation step, a primary alcohol or aldehyde group may also be introduced by treatment of the unsaturated polycyclic alcohol or ester derivative of the dicyclopentadiene hydrocarbon with formaldehyde in the presence of acidic catalyst such as tin tetrachloride, aluminum chloride, sulfuric acid, etc.

While the exact location of the various substituents has not been conclusively ascertained, a typical series of such reactions and the probable structure of the resulting products can be illustrated for the present purposes as follows:

I. Preparation of sec. alcohol or ester (1a)

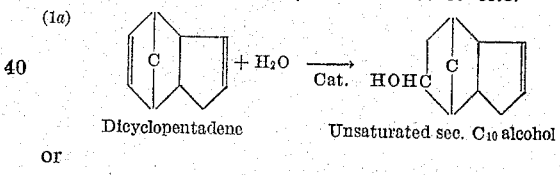

Dicyclopentadiene     Unsaturated sec. $C_{10}$ alcohol or (1b)

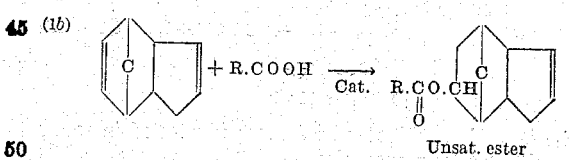

Unsat. ester

II. Preparation of hydroxy aldehyde or glycol, etc.

(2a)

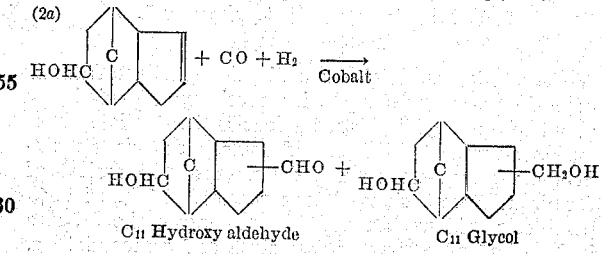

$C_{11}$ Hydroxy aldehyde     $C_{11}$ Glycol or (2b)

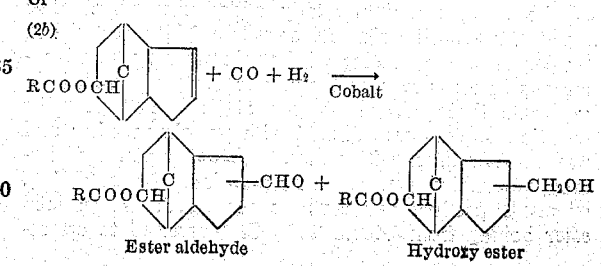

Ester aldehyde     Hydroxy ester or (2a') 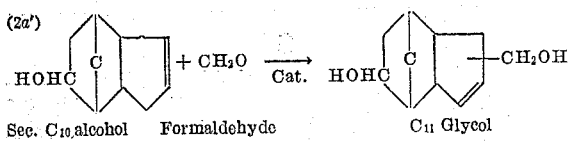

Sec. $C_{10}$ alcohol    Formaldehyde            $C_{11}$ Glycol

III. Alkali fusion (3a) 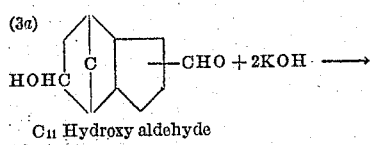

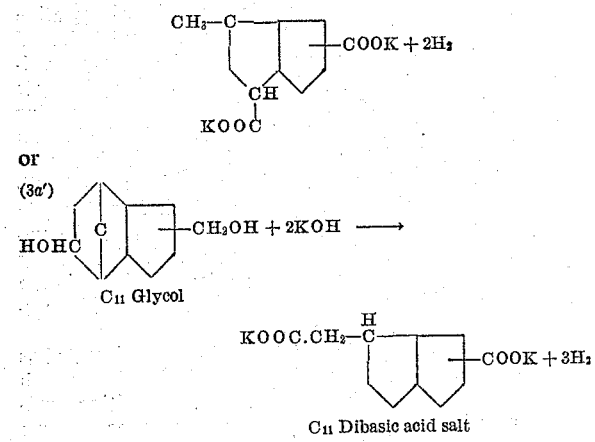

and/or or (3a')

or (3b) 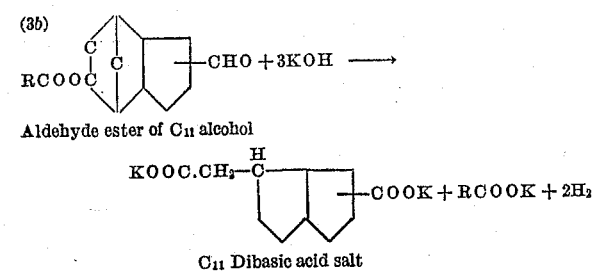

$C_{11}$ Dibasic acid salt

The invention will now be further illustrated in terms of specific working examples.

I-A. Formic ester of dicyclopentadiene ($HCOO.C_{10}H_{13}$)

The starting material was a dicyclopentadiene fraction of 95% purity, the impurities consisting essentially of about 3% methyldicyclopentadiene and 2% dimethyldicyclopentadiene. 1980 g. (15 moles) of this dicyclopentadiene feed stock and 1050 g. (about 23 moles) of formic acid were charged to a reactor. 16 g. of 70% perchloric acid were added with stirring to the mixture in 20 minutes, to serve as a catalyst, and a second 16 g. of the catalyst was gradually added thereafter. The reaction tends to be vigorous as reflected by a fast rise in temperature, and cooling of the mixture may be advantageous in order to keep the reaction temperature within moderate limits, e. g., between 50° and 90° C. The resulting product was diluted with petroleum ether and washed four times with water. A small amount of isopropyl alcohol was used to aid separation. About 2500 g. of crude product can thus be recovered. A purified ester boiling from 240 to 249° C. (corrected to atmospheric) is obtained by distillation of the crude product. The purified ester had an ester number of 0.592 centiquivalent of ester per gram of sample (105% ester), and a bromine number of 85.2 (95% unsaturation), indicating that about one mole of acid combined with each mole of dicyclopentadiene in producing a formic ester of a monoolefinic, tricyclic, secondary alcohol.

I-B. Formic ester of dicyclopentadiene-aldehyde ($HCOO.C_{10}H_{14}.CHO$)

840 g. of the distilled ester product was charged to a 3-liter rocking bomb autoclave for oxonation. 100 ml. of 10% cobalt oleate in hexane was added as catalyst. The reactor was maintained at a temperature between 150° to 170° C. under a pressure of 3500 p. s. i. g. of an equimolar mixture of carbon monoxide and hydrogen. In the course of a total contact time of 24 hours the pressure dropped to 300 p. s. i. g. as the synthesis gas was consumed in the reaction. At this point the pressure was released and about one-third of the resulting crude aldehyde ester was removed and reserved for hydrogenation. The remainder of the crude product was distilled at 4.5 mm. Hg pressure. 260 g. of purified aldehyde ester boiling between 150–160° C. at 4.5 mm. Hg (310–325° C. at atmospheric pressure) was thus recovered. This product had an ester number of 0.612 centiequivalent of ester per gram and a carbonyl number of 0.273 centiequivalent of carbonyl per gram. Allowing for the fact that the two functional groups tend to interfere in the analytical testing procedure, the product appears to be about 92% pure. Of course, some of the aldehyde product is normally converted to the corresponding primary alcohol in the oxonation step itself, due to the free hydrogen present.

I-C. Formic ester of dicyclopentadiene-alcohol ($HCOO.C_{10}H_{14}.CH_2OH$)

A portion of the crude Oxo product described above was hydrogenated over a metallic nickel catalyst to the corresponding alcohol. The hydrogenated product gave 171 g. of hydroxy-ester boiling at 148° C. under 1 mm. Hg pressure (340° C. corrected to atmospheric). The ester number of 0.116 and hydroxyl number of 0.875 indicates that the formate group has been altered to a secondary alcohol group in 70% of the product, giving a mixed product of about 24% hydroxy-ester, $HCOO.C_{10}H_{14}.CH_2OH$ and about 70% secondary-primary glycol, $HO.C_{10}H_{14}.CH_2OH$

I-D. Acetic ester of dicyclopentadiene ($CH_3COO.C_{10}H_{13}$)

The acetic ester was made from 1056 g. of dicyclopentadiene and 720 g. of glacial acetic acid by heating the reagents to 100° C., adding 10 g. of 70% $HClO_4$ over a 5 minute period, and then maintaining the reagents under reflux. The product recovery was similar as described under Example I-A, above. After distilling, an ester product boiling at 103° C. at 4.8 mm. Hg pressure (250° C. corrected to atmospheric) was recovered. This product had an ester number of 0.512 (98.3% ester) and a bromine number of 80.8 (97% unsaturation).

I-E. Acetic ester of dicyclopentadiene-aldehyde ($CH_3COO.C_{10}H_{14}.CHO$)

700 ml. of the distilled ester product from Example I-D was carbonylated substantially by the same procedure as described in Example I-B. A portion of the crude Oxo product again was set aside for subsequent hydrogenation and the remainder was distilled. 205 g. of the aldehyde-ester product were thus recovered. This product, boiling at 131–145° C. at 1 mm. Hg pressure (325–350° C. atm.), had an ester number of 0.552 and a carbonyl number of 0.271, indicating that it was about 91% pure.

After hydrogenating the other portion of the crude Oxo product over nickel catalyst and distilling the hydrogenated product, 84 g. of hydroxy-ester boiling at 137–157° C. at 1.7 mm. pressure (320–340° C. atm.) was recovered. The ester number of 0.410 shows 92% is the hydroxy-ester product, $CH_3COO.C_{10}H_{14}.CH_2OH$. The hydroxyl number of 0.466 shows that in addition to the hydroxy-ester, about 5% of the secondary-primary glycol, $HO.C_{10}H_{14}.CH_2OH$, is formed via the hydrolysis of the hydroxy-ester.

I-F. *Palmitic acid ester*

A similar series of products were made by reacting dicyclopentadiene with palmitic acid, using either perchloric acid or a $BF_3.H_3PO_4$ complex as a catalyst. The resulting ester of dicyclopentadiene,

$$C_{16}H_{31}COO.C_{10}H_{13}$$

boiled between 197–225° C. at 0.7 to 1.4 mm. Hg pressure (430–450° C. at atm. press.), had an ester number of 0.236 (88.5%) and a bromine number of 41.3% (96.8% unsaturation). This ester, when oxonated produced the corresponding ester-aldehyde product,

$$C_{16}H_{31}COO.C_{10}H_{14}.CHO$$

I-G. *Dibasic acid* ($HOOC.C_9H_{14}.COOH$) *by alkali fusion*

A reaction mixture was made up by mixing 147 g. (about 0.66 mole) of the acetic ester-aldehyde from Example I-E, about 11 g. (about 0.06 mole) of the hydroxy-ester and primary-secondary glycol from Example I-E, 32 g. (about 0.15 mole) of the formic ester-aldehyde from Example I-B, and 21 g. (about 0.11 mole) of the alcohol product from Example I-C. The resulting 211 g. of mixture was added during 20 minutes to a nickel reactor containing an essentially anhydrous mixture of 100 g. NaOH, 95 g. KOH and 704 g. of highly refined high boiling hydrocarbon white oil (Primol D). In other words the oxidizable dicyclopentadiene derivatives were mixed with an excess of caustic, using an inert reaction medium having a boiling point higher than the fusion point of the mixture. For instance, saturated hydrocarbons boiling at about 350° C. and higher represent suitable reaction diluent. A single alkali metal base or a mixture of bases can be used in the reaction with about the same effect, except that mixtures have the advantage of being lower melting than the individual ingredients. This advantage can sometimes be important since the alkali fusion is best carried out at temperatures between about 250° and 350° C., preferably below about 300° C.

The reactor used was a closed vessel equipped with a stirrer, thermometer and a gas outlet which passed through a condenser to a wet test meter. The reactor contents during the addition of the dicyclopentadiene compounds were at atmospheric pressure and their temperature was maintained at 280° to 290° C. by gentle heating. The reaction was continued for another 30 minutes with the temperature at 280° to 300° C., during which time 1.92 cu. ft. of hydrogen was liberated.

Thereafter the hot reaction mixture was removed from the reactor by suction. Including the inert diluent, 1025 g. of reaction mixture was removed. This mixture was mixed with about 4000 g. of water and extracted three times with petroleum ether, using about 3000 g. of the ether per extraction. The aqueous portion was then acidified with hydrochloric acid and extracted with about 2000 g. of diethyl ether. After evaporation of the ether the resulting dibasic acid was distilled in a short path still at 1 mm. Hg. 100 gms. of dibasic acid boiling at 206–210° C. at 1 mm. Hg was thus recovered. The acid number was found to be 0.857 centiequivalent/gram, as against a theoretical value of 0.943 corresponding to the pure dicyclic dicarboxylic acid, $HOOC.CH_2.C_9H_{12}.COOH$. The product thus appears to be 91% pure.

Preparation of alkyd resin

The dibasic acid described above was evaluated as the difunctional component of an alkyd resin formulation. The charge consisted of 28 grams of the dibasic acid, 39.2 grams of linseed oil acids, 15.4 grams of glycerol, and 15 cc. of xylene as a water entraining agent. The mixture was cooked in a nitrogen blanketed 300 ml. glass flask for 25 hours at temperatures gradually increasing to a maximum of 238° C. During this time 7.6 cc. of water were evolved.

The resulting resin was cut with 63.3 grams of aromatic naphtha (Solvesso 100), to give a solution containing 55.2% non-volatile matter. The solution was found to have a Gardner viscosity of D and a Gardner color of 4.5. The light color of the resin is especially noteworthy since comparative laboratory cooks of conventional alkyd resins using phthalic anhydride normally have a color of about 9 to 10 on the Gardner scale. The resin solution was evaluated in two films baked at 300° F., one for 30 minutes, the other for 60 minutes. Both films baked satisfactorily without driers and had drying characteristics comparable to those of commercial alkyds such as "Glyptal 2475."

The novel dibasic acids can also be converted to simple or complex esters which may be useful as plasticizers, lube oil additives or synthetic lubricants. The acids or their metal salts also may be used as medicinals or agricultural chemicals.

Of course, while the foregoing example relates specifically to reactions of dicyclopentadiene, similar results are obtained when using the dimer of methylcyclopentadiene, i. e., dimethyldicyclopentadiene, or the mixed dimer of cyclopentadiene and methylcyclopentadiene, i. e., methyldicyclopentadiene, or mixtures thereof.

Having described the general nature, operation, advantages and illustrative examples of the invention, its scope is particularly pointed out in the appended claims.

What is claimed is:

1. A dicarboxylic acid corresponding to the formula

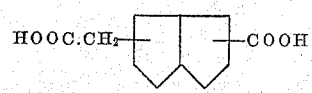

2. A dicarboxylic acid corresponding to the formula

3. A process for making a dicyclic dicarboxylic acid having the formula

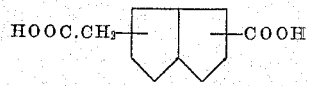

which comprises fusing with an excess of alkali at a temperature of 250° to 350° C. a compound having the formula

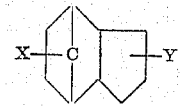

wherein X is a member of the class consisting of hydroxyl radicals —OH, formate radicals HCOO, and ester radicals RCOO— wherein R is an alkyl group of 1 to 15 carbon atoms, and wherein Y is a member of the class consisting of aldehyde radicals —CHO and primary alcohol radicals —$CH_2OH$.

4. In a process for making a difunctional oxygenated derivative of a dicyclopentadiene which comprises hydrating one of its double bonds by reaction with water to form a secondary alcohol, carbonylating the remaining double bond of said secondary alcohol by reaction with a gas mixture of hydrogen and carbon monoxide at a temperature between about 110° and 190° C. and at a pressure between about 1500 and 4500 p. s. i. g. in the presence of a cobalt catalyst, the improvement which comprises fusing the resulting carbonylated derivative with an excess of alkali at a temperature of about 250 to 350° C., and separating a dicarboxylic acid having one more carbon atom than the initial dicyclodiene.

5. In a process for preparing a dicyclic difunctional derivative of dicyclopentadiene which comprises mixing dicyclopentadiene with at least one mole equivalent of a monocarboxylic aliphatic acid of 1 to 16 carbon atoms, maintaining the mixture in the presence of about 0.3 to 10 weight percent based on the dicyclopentadiene of a condensation catalyst containing an acid-acting inorganic group at a temperature of about 50 to 90° C., separating the resulting dicyclopentenyl ester of the formula $R.COO.C_{10}H_{13}$ wherein R is selected from the group consisting of hydrogen and alkyl groups of 1 to 15 carbon atoms from the reaction mixture, reacting the dicyclopentenyl ester with at least one mole equivalent each of carbon monoxide and hydrogen under a pressure of about 1500 to 4500 p. s. i. g. and a temperature of about 110° to 190° C. in the presence of a cobalt carbonylation catalyst, separating the resulting carbonylation product corresponding to the formula $RCOO.C_{10}H_{14}.Y$ wherein Y is a radical of the group consisting of —CHO and —$CH_2OH$ the improvement which comprises fusing the carbonylation product with an exces of alkali at a temperature of about 250 to 300° C. to produce a dicarboxylic acid salt corresponding to the formula $$MOOC.CH_2.C_8H_{12}.COOM$$

wherin M represents an alkali metal atom.

6. A process according to claim 5 wherein the carbonylation product is mixed prior to the fusion step with about 2 to 10 times its weight of an inert hydrocarbon diluent boiling above about 350° C., the reaction mixture is mixed with water subsequent to the alkali fusion, the aqueous portion is acidified with a strong acid, and the desired dibasic acid is recovered from the acidified aqueous portion.

7. In a process for preparing a dicyclic difunctional derivative of dicyclopentadiene which comprises mixing dicyclopentadiene with about 1.5 mole equivalents of a $C_1$ to $C_2$ fatty acid, maintaining its mixture in the presence of a catalytic amount of perchloric acid at a temperature between 50° and 90° C., distilling the resulting fatty acid ester of dicyclopentadiene from the mixture, maintaining the ester in contact with an approximately equimolar mixture of hydrogen and carbon monoxide in the presence of a $C_6$ to $C_7$ hydrocarbon diluent and a cobalt carbonylation catalyst under a pressure of about 2000 to 4000 p. s. i. g. and a temperature of about 150° to 170° C., distilling the resulting esteraldehyde derivative of dicyclopentadiene from the reaction mixture, diluting the separated ester-aldehyde derivative with an inert liquid hydrocarbon boiling above 350° C., the improvement which comprises heating the diluted ester-aldehyde derivative with an excess of a molten alkali metal hydroxide at a temperature between about 250° and 350° C. until the ester-aldehyde derivative is converted to a dibasic acid.

8. A process according to claim 7 wherein the alkali metal hydroxide used in the fusion step comprises a low melting mixture of about 1 to 2 moles of sodium hydroxide per mole of potassium hydroxide and wherein the fusion is effected at a temperature not above 300° C.

References Cited in the file of this patent

UNITED STATES PATENTS

| 2,181,893 | Hopkins et al. | Dec. 5, 1939 |
| 2,395,452 | Bruson | Feb. 26, 1946 |
| 2,437,600 | Gresham et al. | Mar. 9, 1948 |
| 2,567,026 | Pelton et al. | Sept. 4, 1951 |
| 2,727,050 | Sutton | Dec. 13, 1955 |
| 2,749,328 | Cline | June 5, 1956 |